United States Patent [19]

Peters et al.

[11] Patent Number: 4,513,101

[45] Date of Patent: Apr. 23, 1985

[54] SMALL BEAD AUTO EXHAUST CATALYST

[75] Inventors: Alan W. Peters, Rockville; Gwan Kim, Olney; Michael V. Ernest, Baltimore, all of Md.

[73] Assignee: W. R. Grace & Co., New York, N.Y.

[21] Appl. No.: 517,809

[22] Filed: Jul. 27, 1983

[51] Int. Cl.³ .................. B01J 21/04; B01J 23/10; B01J 23/58
[52] U.S. Cl. .................. 502/304; 502/330; 502/332; 502/333; 502/334; 423/213.5
[58] Field of Search ............... 502/304, 333, 334, 330, 502/332; 423/213.5

[56] References Cited

U.S. PATENT DOCUMENTS 4,390,456 6/1983 Sanchez et al. .................. 502/8
4,392,987 7/1983 Laine et al. .................. 502/439

OTHER PUBLICATIONS

Ernest et al, "Development of More Active and Durable Automotive Exhaust Catalysts", Society of Automotive Engineers, Paper No. 800083, Feb. 1980.

Primary Examiner—W. J. Shine
Attorney, Agent, or Firm—Edward J. Cabic

[57] ABSTRACT

Alumina particle catalysts which can be used for auto emission control and especially as a three-way catalyst have increased performance. The alumina particles which are preferably spheroids have a low compacted bulk density of about 20 to 36 pounds per cubic foot and a smaller size on the order of less than 2.6 mm for the preferred spheroids. The spheroid embodiment also has a high crush strength. Because of the small size the ratio of the geometric surface area to the bulk volume (GSA/BV) is at least about 14 $cm^2/cm^3$. These alumina particles are impregnated with a catalytically-effective amount of one or more platinum group metals such as platinum, palladium or rhodium and additional promoters can also be added. In the preferred embodiment the alumina particles have a GSA/BV ratio of from about 17 to 25 $cm^2/cm^3$ for substantially improved performance.

4 Claims, No Drawings

SMALL BEAD AUTO EXHAUST CATALYST

FIELD OF THE INVENTION

This invention relates to small size catalysts which are made of alumina particles and spheroids having platinum group metals thereon. They can be used in reducing auto exhaust emissions.

DESCRIPTION OF PREVIOUSLY PUBLISHED ART

Spheroidal beads have been used as supports for auto exhaust catalysts. The Sanchez et al U.S. Pat. No. 4,279,779 discloses such particles having a combination of high macroporosity, surface area, crush strength, and low attrition loss and bulk density. The mesh size for these particles is broadly defined to be generally −4 +10 which means that they remain on a mesh of 10 in the smallest case. However, in the more preferred embodiment the mesh size is −5 +7 which means the smallest particle remains on a mesh of 7. From the U.S. standard sieve screens, a mesh of 10 has an opening of 1.68 mm while the preferred minimum mesh of 7 has an opening of 2.83 mm. This means that the smallest particles in the contemplated preferred case would be larger than 2.83 mm. In Table 9 of the patent the calcined spheroids made in Example 8 had an average diameter of 135 mils which corresponds to 3.43 mm. Thus, the spheres actually employed in the Sanchez et al patent are generally of a larger size and have an average diameter of about 3 mm. or larger. The Sanchez et al patent does not suggest or focus on making and using the smaller size spheres according to the present invention.

OBJECTS OF THE INVENTION

It is an object of this invention to produce auto exhaust catalysts having a smaller size than conventionally used to obtain better catalytic performance.

It is a further object of this invention to produce an auto exhaust catalyst which utilizes small size particles which have a relatively high ratio of geometric surface area to bulk volume.

It is a further object of this invention to produce an auto exhaust catalyst which utilizes small size spherical particles to achieve better activity and durability of CO, HC and $NO_x$ removals.

These and further objects will become apparent as the description of the invention proceeds.

SUMMARY OF THE INVENTION

The performance of alumina particle catalysts which can be used for auto emission control and especially as a three-way catalyst (TWC) has been increased. This has been accomplished by using an alumina particle which has a low compacted bulk density of about 20 to 36 pounds per cubic foot and decreasing its size so that the ratio of the geometric surface area to its bulk volume (GSA/BV) is at least about 14 $cm^2/cm^3$. These alumina particles are impregnated with a catalytically-effective amount of one or more platinum group metals such as platinum, palladium or rhodium and additional promoters can also be added. In the preferred embodiment spheroidal alumina particles are employed which have an effective diameter of less than 2.6 mm when measured on a sphere having an equivalent volume as the spheroidal particle. In another preferred embodiment the alumina particles have a GSA/BV ratio of from about 17 to 25 $cm^2/cm^3$.

DESCRIPTION OF THE INVENTION

It has been well established that the performance of auto exhaust catalysts is strongly controlled by pore diffusion. Because of this effect, it is desirable to distribute the catalytic materials and especially the precious metals within the outer region of the catalyst particle which is a region to where the gases can readily diffuse. In the case of pellets, this region is the outer shell which has some limited thickness. Although the catalytic materials placed in the outer shell are more likely to be poisoned out than catalytic materials located at a more internal position which is further away from the outer surface, it is still desirable to place the catalytic materials in the outer shell in such a manner as to maximize the catalyst activity and durability.

We have found that one way to improve the long-term performance durability of pelleted auto exhaust catalysts, especially three-way catalysts, is to increase the ratio of geometrical surface area to bulk volume (GSA/BV) so that the total volume of the catalytic material in the outer shell of some desired thickness per unit charge of the catalyst will increase. We have found that superior performance is achieved when the particles have a ratio of geometrical surface area to bulk volume of at least 14 $cm^2/cm^3$. The ratio of GSA/BV is obtained experimentally by multiplying together the geometrical surface area ($cm^2$) of a sphere times the "count" which is the number of particles per unit bulk volume (number/$cm^3$). By geometrical surface area we mean the exterior surface area of the particle that is exposed to a fluid to be treated. This does not include the internal pore volume of a porous particle as would be measured by B.E.T. nitrogen.

The surface area of a particle can be determined using conventional mathematical formulas for the various geometrical shapes. For an oblate spheroid the geometric surface areas (GSA) is $$GSA = 2\pi a^2 + \pi \frac{b^2}{\epsilon} \log_e \frac{1+\epsilon}{1-\epsilon}$$

where a is the major semi-axis, b is the minor semi-axis and $\epsilon$ is the eccentricity which is defined as $$\epsilon = \frac{\sqrt{a^2 - b^2}}{a}$$

The "count" is determined by filling a known volume with spheres and then counting the number of spheres in the volume. From these two values the number of spheroids per $cm^3$ can be determined.

This higher ratio of GSA/BV is preferably achieved by decreasing the size of the particles and, in the case of the preferred spheres, by decreasing the diameter of the sphere. In other words, the long-term catalyst performance improves as the size of the catalyst pellet decreases for a given metals loading per unit charge. Although the exact mechanism of the invention is not fully known, it is believed that the contribution from catalytic metals as well as promoters in the diffusionally effective outer shell increases with decreasing size.

We have found that for spheroidal alumina particles which have a crushing force per square radius of at least 8.0 Newtons/$mm^2$, the desired high GSA/BV ratio of at least 14 cm²/cm³ is obtained when the particles have an equivalent diameter of less than 2.6 mm when measured on a sphere having an equivalent volume as the spheroidal particle.

The small alumina spheres used in the preferred spheroidal embodiment are preferably made by the technique disclosed by N. R. Laine and J. E. Herrera in U.S. Pat. No. 4,392,987. There, separate streams of an immiscible fluid such as air and an alumina slurry in an acidic aqueous medium, as described by M. G. Sanchez et al in U.S. Pat. No. 4,179,408, are pumped to a spray nozzle where the immiscible fluid mixes with and breaks up the alumina slurry stream. Fluid pressure within the nozzle sprays the alumina droplets into the kerosene where the droplets gel into spheroids. Droplet sizes are primarily controlled by the air flow rate. Low air flow rates will produce relatively large droplets while increasing the air flow rate will produce smaller droplets. The droplet size can also be decreased by decreasing the liquid flow rate, but for commercial reasons, it is better to run at a high liquid flow rate and to control droplet size by varying the air flow rate.

The spheres made by this preferred process have a low compacted bulk density of about 20 to about 36 pounds per cubic foot.

Standard, commercially available, spray nozzles can be used to produce the spheroids. Choice of nozzle depends upon the pumping rates and the spray pattern desired.

The droplets were sprayed into a a kerosene containing column of the type described by M. G. Sanchez et al in U.S. Pat. No. 4,179,408. The distance from the spray nozzle to the kerosene containing column was maintained at about one inch so the droplets would be separated and not interfere with each other.

High volume throughputs are possible with spray nozzles. The size and design of the spray nozzle can be varied to allow slurry flows ranging from 0.1 gallon per hour to greater than 300 gallons per hour for one nozzle. The limiting factors are the size of the spheroid column and its gelation capacity.

Although spheroids as small as 0.1 mm. can be made by this technique, practical considerations probably limit its application to the formation of spheroids larger than 60 mesh (0.25 mm.). Bouyancy of the smaller spheroids in the two phase liquid column becomes an important consideration for the smaller sizes. Also equipment for separation of the small spheroids from the liquid phase and drying them may increase the costs of the process.

When making alumina particle catalysts, promoters can be used in addition to the platinum group metals. For example, a $CeO_2$ promoter can be applied preferably between 1 to 10 wt. % and more preferably between 2-6 wt. %. An additional amount of an alkali metal promoter can be applied, which when expressed as the weight percent of the oxide $M_2O$, may be any effective amount up to about 5 wt. % and more preferably from about 0.5 to 3 wt. %.

The platinum group metal component may be platinum, palladium, rhodium, ruthenium, iridium, osmium, and mixtures thereof, with the preferred metals being Pt, Pd, Rh either alone or in any combination. When the platinum group metal contains more than one of such components, the component may be composed of a major amount of platinum or palladium and a minor amount of one or more of the other platinum group metals such as rhodium. The catalytic metals mixture may comprise from about 1 to about 10 wt. % rhodium and from about 90 to about 99 wt. % platinum, palladium, or mixtures thereof and preferably about 5 wt. % rhodium and about 95 wt. % platinum, palladium, or mixtures thereof.

Various compounds, complexes, or fine metal dispersions of any of the platinum group metals in aqueous or organic mediums may be used to achieve deposition of the platinum group metal component on the composite. A suitable liquid medium will not react with the platinum group metal component and is removable on drying which can be accomplished as part of the preparation or in use of the catalyst. Water soluble platinum group metal compounds or complexes may conveniently be used. Suitable platinum group metal compounds include chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

In a preferred embodiment of this invention, the impregnation solution contains an ammonium sulfito complex of platinum group metal prepared according to the methods described in U.S. Pat. No. 3,932,309 to Graham et al. The use of these complexes provides excellent dispersion and control of penetration depth of the platinum group metal. Preferably, rhodium is incorporated in the catalyst by impregnation with an acid rhodium sulfito complex prepared by reacting rhodium trichloride or rhodium hydrous oxide with sulfurous acid.

After the impregnations are completed, the composition may be dried, for example, at a temperature of from about 100° C. to about 150° C. for about 2 to about 20 hours. The salt composition may be decomposed and the catalyst activated under conditions which provide a composition having characteristics that promote the desired reaction. The temperature of this activation is low enough to permit neither noble metal sintering nor sintering of the support. It is preferably done in a reducing atmosphere, e.g., by about a 1 hour reduction in flowing nitrogen containing from 2 to 5 volume percent hydrogen at about 250°-550° C. and more preferably at about 400° C.

In the catalyst of this invention, the platinum group metals are the major catalytic ingredients for oxidation, reduction and decomposition reactions and are present in amounts sufficient to provide catalytic compositions having significant activity for catalyzing these reactions. Generally, the amount of platinum group metal used is a minor portion of the catalyst composite and typically does not exceed about 10 weight percent of the calcined composite. The amount may be about 0.05 to 10 percent and is preferably about 0.1 to 6 percent based on the weight of the calcined composite to maintain good activity with prolonged use.

As with the larger size particles, it is possible to change the noble metals impregnation strategy to change the penetration depth. By trial and error, it is possible to obtain the optimum metals penetration for a given size particle to obtain the optimum catalyst durability.

In the present comparison examples, the impregnation strategy was to load up the largest size to a given level and insert them in a test reactor with a given volume. From this one can calculate the total metals content in the reactor. Then in subsequent comparisons using progressively smaller size beads the amount of noble metals applied was such that when these beads were placed in the same reactor, the total content of the noble metals was the same. The net result is that for each individual smaller particle there will be less noble metal on it. Accordingly, at a given penetration depth there will be a smaller concentration of noble metals. However, it should be remembered that since there will be more of the smaller beads present, the total amount of the noble metals is still the same.

With this impregnation strategy where the total amount of noble metals is constant for a given reactor size, we have found that there is an optimal range of bead size for the loading given on the largest size comparison bead. As shown in Example 5 infra, the TWC performance data after 141 hours of aging shows an optimum Net $NO_x$ percent conversion under lean conditions (R=1.5) for the D sample with shouldering values for the C and E samples. A similar optimum for peak Net $NO_x$ is also shown for Sample D. Thus, under this impregnation strategy, it can be expected to achieve optimum results for spheroid beads having a GSA/BV of from about 17 to 25.

In order to demonstrate the superiority of the auto exhaust catalyst supported on small spheres with a high GSA/BV ratio according to the present invention, a series of tests have been performed. The complete details of the procedures are set forth in a later section entitled Test Procedures.

One of the tests measures the HC, CO and $NO_x$ conversion of the fresh catalyst at the stoichiometric point. Test results to be discussed later in Example 3 show that the small beads of the present invention having the high GSA/BV ratio are clearly superior to the larger beads of the prior art.

To measure the long term performance of the catalyst, pulsator aging tests have been employed which simulate engine conditions. The test subjects the catalyst to alternating oxidizing and reducing conditions over a period of time with a fuel feed which contains an increased level of poisons, such as Pb, P and S.

After the catalysts have been aged, various evaluation tests are employed. In one test, the HC, CO and $NO_x$ conversions are measured at the stoichiometric point to determine the three-way performance of the catalyst. The results are shown in Table IV and again, the catalyst according to the present invention had better conversions than the larger size conventional beads shown in catalyst sample A.

Another test performed on the pulsator aged catalyst is an oxidizing warm-up test. This test measures the light-off properties to determine the extent of permanent deactivation. The test is done under oxidizing conditions and the time for 50% conversion of CO and HC is measured as well as the HC and CO efficiencies and the time from 10% CO to 90% conversion. The results presented in Table III also show superior performance for the present catalyst having the higher GSA/BV ratio.

Another test employed is to treat the catalyst for 24 hours at 1800° F. (982° C.) in a closed furnace which causes sintering in an oxidizing environment. Although this harsh treatment significantly reduces the extent of HC, CO and $NO_x$ conversion, the smaller bead particles as shown in Table IV still have higher conversions than the larger size conventional beads.

A further test performed is a step change from the lean side to the rich side to measure the delay time for a change in CO activity. The test measures the oxygen storability of the catalyst and as shown in Table V there is an advantageous longer delay time for catalyst beads according to the present invention.

Test Procedures

TWC Activity Test—This laboratory test simulates full size converter tests employed in TWC evaluation. It is described in more detail by M. V. Ernest and G. Kim in Soc. Automot. Eng. Paper No. 800083 where a schematic diagram of the apparatus is given along with the composition of the rich and lean streams. In order to simulate the perturbation which is required for good performance (high conversion of HC, CO and $NO_x$) about the stoichiometric air-to-fuel ratio and which has been achieved in actual engine dynamometer tests, we alternate separate CO, $H_2$ and air mixtures which have been blended to rich and lean stoichiometry. The average feed composition will be somewhere between the lean and rich extremes and is controlled by varying the duration of the lean and rich pulses. In our test the overall pulse duration (lean+rich) is maintained at one second. The simulated auto exhaust gas mixture is described in Table I of the article. The average reducing or oxidizing condition of the feed mixture is represented by the ratio R given below:

$$R = \frac{[O_2] + 0.5 \, [NO]}{\frac{2}{3} \, [CO] + 5 \, [C_3H_8] + 4.5 \, [C_3H_6]}$$

where $[O_2]$, $[NO]$, $[CO]$, $[C_3H_8]$ and $[C_3H_6]$ are the molar concentrations in the feed gas. The conversions of HC, CO and NO are examined as a function of the ratio R. A constant inlet temperature of 482° C. is maintained throughout the test with a GHSV of 92,000 and a superficial linear velocity of 63 cm/sec in the reactor.

The use of a single bed catalyst to control HC, CO and $NO_x$ emissions requires operation near the crossover point of the CO and gross $NO_x$ conversion curves, known as $R_V$. The region bounded by the CO conversion on the rich side and $NO_x$ conversion on the lean side is the TWC "window". We have defined a quantitative measure for the TWC window as well as for the hydrocarbon performance in that region. These measures indicate the areas, as percent of the maximum possible areas, under the CO and NO conversion curves and under the hydrocarbon conversion curve determined at $R_V \pm 0.3$.

Pulsator Aging—In this test the catalysts are aged by subjecting each to a certain period of time of pulsator aging by the procedure described by M. V. Ernest and G. Kim in Soc. Automot. Eng. Paper No. 800083. More specifically, this laboratory aging of catalyst samples on slightly modified pulsators simulates dynamometer aging tests. The system allows poisons such as Pb, P and S to deposit on catalysts while they are exposed to temperatures cycling between 510° and 677° C. under oscillating conditions between slightly reducing and slightly oxidizing. The fuel here was different from that described in the article since it consisted of n-hexane containing 0.026 Pb g/liter, 0.066 P g/liter and 0.040 weight % S. It was fed at a rate of 1.77 liter fuel/hour/liter catalyst, and this has been found to be equivalent to the extent of deactivation observed in full scale dynamometer aging tests. Samples evaluated in the oxidizing warm-up test were those that were aged for 92 hours, while those that were evaluated in the three-way catalyst testing were 141-hour pulsator-aged samples.

Oxidizing Warm-Up Test—This test is used to determine the extent of permanent deactivation. It basically utilizes the test described by M. V. Ernest and G. Kim in Soc. Automot. Eng. Paper No. 800083. Again, more specifically the test involves a scaled down version of a full size converter test which is designed to measure both the lightoff characteristics of a catalyst as well as steady-state CO and HC conversion efficiencies. In the procedure the catalyst, initially at ambient temperature, is contacted with a preheated gas mixture consisting of 3 vol. % CO, 4.5% $O_2$, 10% $H_2O$, 433 ppm $C_3H_8$ and the balance $N_2$. Because of the high level of oxidizable species present in the feed, the temperature of the catalyst bed rises depending upon the activity of the catalyst. These catalysts were tested at a GHSV of 59,000 and a superficial linear velocity of 40 cm/sec.

CO Activity Delay Time—This test measures the oxygen storability which is the ability of the catalyst to allow some oxygen storage. The test is described in detail by G. Kim in I&EC Product Research & Development, 1982, 21, 267 and consists of exposing the promoted catalyst for 10 minutes to the lean side conditions where R=1.5 at a gas inlet temperature of 482° C. Then there is a step change to the rich conditions where R=0.5. The amount of CO measured by the CO detector slowly increases to an equilibrium value after an initial delay. The flushing time for the reactor system is determined by using a dummy catalyst with no promoter. The rich condition gas is fed to the system and the time until the CO detector starts measuring an increase in CO content is determined as the system delay time. The delay time reported as the test result for a promoted catalyst is the difference in the length of time measured for the promoted catalyst and the system delay time measured by the unpromoted catalyst.

EXAMPLE 1

Larger size alumina support beads were made according to the procedure in Example 8 of the Sanchez et al Pat. No. 4,179,408 and they are labeled Sample A. The smaller size beads having the higher GSA/BV ratio employed according to the present invention were made according to the procedure of Example 2 of the Laine et al U.S. Pat. No. 4,392,987. The smaller beads representing the −7 +8 mesh sphere fraction are labelled Sample B, the −8 +10 mesh sphere fraction are labelled Sample C, the −10 +12 mesh sphere fraction are labelled Sample D, and −12 +14 mesh sphere fraction are labelled Sample E. The slight differences between the geometric surface area per unit volume reported by Laine and the GSA/BV reported here is due to the use of the oblate spheroid model here for determining surface area calculations.

The beads were made into catalysts typically by spraying a fine mist of aqueous solutions bearing precious metals such as platinum, palladium, and rhodium to incipient wetness, followed by about 110° to about 135° C. air drying and a final activation by hydrogen at 350° to about 480° C.

For example, catalyst A in Table I was prepared as follows. First a batch of alumina beads promoted with 3 weight % $CeO_2$ was prepared by impregnating alumina spheres, which had been calcined in 1038° C. air for one hour, with an aqueous solution of cerous nitrate to incipient wetness, followed by drying in air at 135° C. and 1 hour calcination in 732° C. air. The resulting beads were sifted through 5 and 8 mesh sieves. Next, 180 grams of these beads having the dimension shown under column A of Table I were impreganated to the extent of 90% incipient wetness by spraying with fine mist of a solution bearing palladium. This palladium solution was prepared by bubbling $SO_2$ gas from a cylinder into approximately 120 ml of water for 1.93 min. at a rate of 2 millimoles of $SO_2$/min. To this was added with stirring 0.705 ml of palladium nitrate solution having a concentration of 129.829 grams Pd/liter solution. The resulting palladium sulfito complex solution was diluted to 157 ml after dissolving 0.210 gram of dibasic ammonium citrate crystals.

After overnight drying at 135° C., the beads were reimpregnated with an aqueous solution bearing both platinum and rhodium. This solution was prepared by mixing three separately obtained solutions as follows.

The first stock solution was a solution of an ammonium platinum sulfito complex which was prepared by adding 7.99 grams of 45.8% ammonium bisulfite solution to approximately 375 ml of water, raising the pH of the solution to 8.65, and then adding 7.2841 grams of chloroplatinic acid solution bearing 1.500 grams of platinum metal. The solution was diluted to exactly 500 ml, which contained 3 mg of platinum per ml of solution. Upon standing at room temperature for about 1-2 hours this solution turned colorless.

The second stock solution was a solution of an acid rhodium sulfito complex which was prepared by contacting approximately 60 ml of dilute sulfurous acid bearing 0.374 gram of pure $SO_2$ with a rhodium trichloride solution bearing 200 mg of rhodium metal, followed by dilution to 100 ml and by a 1 hour soak in 60° C. water in a sealed container. The resulting sulfito complex solution supplies 2 mg of rhodium per ml.

The third solution is a rhodium nitrate solution.

To exactly 76.23 ml of the above-prepared first platinum sulfito complex stock solution was added 5.72 ml of the second rhodium sulfito complex stock solution and the third rhodium nitrate solution in an amount bearing 11.44 mg rhodium metal. The resulting solution was diluted to 140 ml before spraying. After 135° C. air drying again, the beads were activated by 1 hour reduction in flowing hydrogen (5% $H_2$+95% $N_2$) at approximately 400° C. Catalysts B-E were prepared in exactly the same manner.

The physical properties of the catalysts were as set forth in Table I.

TABLE I

| Physical Properties of Catalysts | | | | | |
|---|---|---|---|---|---|
| Sample | A | B | C | D | E |
| Bulk Density, g./cm.$^3$ | 0.519 | 0.494 | 0.486 | 0.478 | 0.484 |
| Surface area, m.$^2$/g. | 120 | 121 | 119 | 125 | 125 |
| Geom. S.A./Bulk Vol.$^c$, cm.$^2$/cm.$^3$ | 11.42 | 14.96 | 17.89 | 21.31 | 24.65 |
| Crush Strength$^a$ (minor axis), Newtons | 24.4 | 15.6 | 12.5 | 8.8 | 6.9 |
| Crushing Force/R$^2$ Newtons/mm.$^{2,d}$ | 9.1 | 10.2 | 11.2 | 10.6 | 12.1 |
| Size, mm. | | | | | |
| Major axis | 3.51 | 2.62 | 2.16 | 1.85 | 1.55 |
| Minor Axis | 2.87 | 2.21 | 2.01 | 1.75 | 1.45 |
| Diam. of equivalent sphere$^e$, mm. | 3.28 | 2.47 | 2.11 | 1.82 | 1.51 |
| Sphericity | 1.23 | 1.18 | 1.08 | 1.06 | 1.06 |
| Std. Dev. | 0.01 | 0.08 | 0.05 | 0.05 | 0.07 |
| Screen analysis, wt. % | | | | | |
| + 5 mesh | 0 | 0 | 0 | 0 | 0 |

TABLE I-continued

| | Physical Properties of Catalysts | | | | |
|---|---|---|---|---|---|
| Sample | A | B | C | D | E |
| −5 + 6 | 3.99 | 0 | 0 | 0 | 0 |
| −6 + 7 | 95.17 | 0.85 | 0 | 0 | 0 |
| −7 + 8 | 0.84 | 68.32 | 1.78 | 0 | 0 |
| −8 + 10 | 0 | 30.55 | 79.84 | 1.57 | 0 |
| −10 + 12 | 0 | 0.28 | 18.24 | 82.09 | 0.95 |
| −12 + 14 | 0 | Trace | 0.14 | 16.30 | 92.83 |
| −14 + 16 | 0 | 0 | Trace | 0.04 | 5.96 |
| − 16 | 0 | 0 | 0 | Trace | 0.26 |
| Spheroids/cm.$^3$ | 33.56 | 77.47 | 128.14 | 204.71 | 341.72 |
| Packing Fraction | 0.620 | 0.614 | 0.628 | 0.646 | 0.622 |

$^a$Crush strength on humidified (50% RH at ambient temperature for 16 hours) sample. 25 crushes.
$^b$25 measurements each dimension.
$^c$Calculated based on an oblate spheroid model
$^d$R is ½ of the diameter of the equivalent sphere From this data it is seen that the crushing force per radius squared is at least 8.0 Newtons/mm$^2$.

The pore properties of the fresh catalysts were as set forth in Table II below.

TABLE II

| | Pore Properties of Fresh Catalysts | | | | |
|---|---|---|---|---|---|
| Catalyst | A | B | C | D | E |
| Total Pore Volume (cm$^3$) from Pores with 35–10K AU Pore Diameter | 0.9957 | 0.9704 | 1.0223 | 0.9678 | 0.9630 |
| Apparent Pore Volume (cm$^3$) Distribution vs. Pore Diameter Range (AU) | | | | | |
| >10K | 0.5800 | 0.5822 | 0.5122 | 0.6333 | 0.5332 |
| 600–10K | 0.4118 | 0.3574 | 0.4258 | 0.3613 | 0.3467 |
| 140–10K | 0.8937 | 0.8547 | 0.9049 | 0.8411 | 0.8385 |
| ≦140 | 0.1020 | 0.1157 | 0.1174 | 0.1267 | 0.1245 |
| Median Pore Diameter, AU | 378 | 340 | 350 | 299 | 354 | where AU = Angstrom unit

EXAMPLE 2

In this example the catalysts are tested for warm-up activity to determine their light-off properties.

After 92 hours of pulsator aging the samples are removed from the aging unit to determine the extent of permanent deactivation using the oxidizing warm-up test as described in the Test Procedure section.

The results are set forth in Table III.

TABLE III

| Oxidizing Warmup Activities After 92 Hours of Pulsator Aging$^a$ | | | | | |
|---|---|---|---|---|---|
| Catalyst Sample | A | B | C | D | E |
| GSA/BV (cm.$^2$/cm.$^3$) Activity Parameter$^c$ | 11.42 | 14.96 | 17.89 | 21.31 | 24.65 |
| Δt, sec. | 26.6 | 19.8 | 20.1 | 18.6 | 16.8 |
| t$_{50}$CO, sec. | 77.4 | 66.9 | 68.4 | 71.1 | 54.0 |
| t$_{50}$HC, sec. | —$^b$ | 222.0 | 272.0 | 190.5 | 102.0 |
| C$_3$H$_8$ Efficiency, % | 49.6 | 60.8 | 57.9 | 61.2 | 77.2 |
| CO Efficiency, % | 98.3 | 99.2 | 99.2 | 99.3 | 99.5 |

$^a$Aged with fuel containing - 0.026 g. Pb/liter., 0.066 g. P/liter and 0.04 weight % sulfur.
$^b$50% conversion level not reached since the C$_3$H$_8$ efficiency was only 49.6%.
$^c$Δt is the time required to reach 90% conversion of CO from 10% conversion. t$_{50}$CO and t$_{50}$HC represent the time required to attain 50% conversion of CO and HC, respectively.

All of the activity parameters show better warmup activity for the smaller spheres. There is a steady drop in the time required to reach 90% conversion of CO from 10% conversion and in the time required to attain 50% conversion of CO. For the time required to attain 50% conversion of HC there was a significant drop in the time to 102 seconds for Catalyst E as compared to 222.0 seconds for Catalyst B. The C$_3$H$_8$ efficiency substantially increased from levels of 49.6% and 60.8% for Catalysts A and B to the higher level of 77.2% for Catalyst E. The CO efficiency remained high with an even small increase being observed.

EXAMPLE 3

In this example the catalysts are tested for three-way catalyst performance after pulsator aging.

The catalysts were pulsator aged for 141 hours in an environment simulating engine conditions. They were tested both fresh before aging and after aging. The equipment and procedures are similar to those described above in the Warmup Test in Example 2 with a few exceptions. For this study the pulsator aging test was for 141 hours using a n-hexane fuel containing 0.026 g. Pb/liter, 0.066 g. P/liter and 0.04 wt. % S over 8.5 cc. of catalyst at 18,200 GHSV. The temperature was cycled from 593° C. (100 min.) to 760° C. (44 min.) operating at 1.77 liter fuel/liter catalyst/hour. The samples were also tested after a 24 hour heat treatment at 1800° F. (982° C.) in a closed furnace, simulating sintering in an oxidizing environment. The effect of bead size on CO, hydrocarbon and NO conversions at the stoichiometric point are shown in Table IV for both fresh and aged catalysts.

TABLE IV

| HC, CO and NO Conversion at the Stochiometric Point | | | | | |
|---|---|---|---|---|---|
| | A | B | C | D | E |
| GSA/BV (cm.$^2$/cm.$^3$)$^a$ | 11.42 | 14.96 | 17.89 | 21.31 | 24.65 |
| HC Conversion, % | | | | | |
| Fresh | 95 | 97 | 98 | 99 | 100 |
| Pulsator aged | 71 | 75 | 78 | 81 | 84 |
| 24 hrs. in 982° C. air | 60 | 64 | 67 | 71 | 73 |
| CO Conversion, % | | | | | |
| Fresh | 89 | 89 | 89 | 90 | 91 |
| Pulsator aged | 76 | 82 | 83 | 85 | 88 |
| 24 hrs. in 982° C. air | 58 | 64 | 67 | 72 | 75 |
| NO Conversion, % | | | | | |
| Fresh | 84 | 87 | 88 | 89 | 91 |
| Pulsator aged | 63 | 67 | 70 | 74 | 77 |
| 24 hrs. in 982° C. air | 35 | 39 | 42 | 46 | 50 |

$^a$Geometric Surface Area/Bulk Volume

The hydrocarbon (HC) and NO conversions show the improvement with decreasing bead size for fresh as well as pulsator aged and thermally aged catalysts. CO conversions are very high and nearly flat for the fresh catalysts which indicates that there is enough metal surface initially available for CO oxidation regardless of the bead size. After the catalysts have been aged, the available metal surface generally decreases. However, with the smaller size catalysts according to the present invention there is a substantial improvement in CO oxidation of from 76 to 88% for the pulsator aged catalysts and from 58 to 75% for the severe 24 hour aged materials.

EXAMPLE 4

This example measures the ability of the catalysts to continue to oxidize CO to CO$_2$ on the rich side when there is less oxygen present.

The test used is the CO Activity Delay Time test described in the Test Procedures. When using a ceria promoted catalyst as prepared in Example 1, there is an additional delay time in which the initial CO conversion level on the lean side is maintained even after the oxygen supply is reduced. In the test the same reactor volume was used and the total amount of ceria for each size sample was the same. The length of this delay time for each catalyst is set forth in Table 4 below and it is a measure of the oxygen storability of the catalyst.

TABLE V

| CO Response to Step Change from R = 1.5 (10 Min.) to R = 0.5 | | | | | |
|---|---|---|---|---|---|
| Sample | A | B | C | D | E |
| GSA/BV (cm.$^2$/cm.$^3$) | 11.42 | 14.96 | 17.89 | 21.31 | 24.65 |
| Fresh, sec. | 3.4 | 5.5 | 7.1 | 9.0 | 10.1 |
| Pulsator Aged for 141 Hrs., sec. | 2.0 | 2.2 | 2.3 | 2.5 | 3.1 |

Although all of the spheres have the same total amount of ceria, there is more promoting effect for the smaller size spheres as seen by the significantly longer delay times. This test again shows the supriority obtained for the smaller size beads.

EXAMPLE 5

The example presents further analysis of the TWC performance.

The catalysts given the 141 hour pulsator aging in Example 3 were further tested for HC, CO and NO$_x$ conversions at varying R values. The conversions are plotted against R. When the CO and NO$_x$ curves crossover, a TWC window is formed under the crossover curves. The size of the window is determined by finding the R point at the crossover and going to the right and left 0.3 units of R. The results of the analysis of the conversion curves is set forth in Table VI.

TABLE VI

| TWC Performance After 141 Hours Pulsator Aging | | | | | |
|---|---|---|---|---|---|
| Sample | A | B | C | D | E |
| GSA/BV (cm$^2$/cm$^3$) | 11.42 | 14.96 | 17.89 | 21.31 | 24.65 |
| Crossover | | | | | |
| R | 0.841 | 0.957 | 0.949 | 0.896 | No crossover |
| CO and GNO$_x$ % | 65.6 | 74.9 | 77.8 | 78.5 | |
| HC | 65.3 | 78.7 | 82.3 | 82.5 | |

TABLE VI-continued

| TWC Performance After 141 Hours Pulsator Aging | | | | | |
|---|---|---|---|---|---|
| Sample | A | B | C | D | E |
| R = 1.5 | | | | | |
| CO eff | 81.5 | 91.1 | 93.8 | 85.1 | 90.5 |
| HC | 66.3 | 78.2 | 80.7 | 81.3 | 84.2 |
| Net NO$_x$ % | 32.8 | 45.8 | 49.2 | 60.2 | 57.1 |
| Peak Net NO$_x$ | | | | | |
| R | 0.624 | 0.787 | 0.787 | 0.808 | 1.013 |
| CO eff % | 47.0 | 55.3 | 62.5 | 66.7 | 91.1 |
| HC eff % | 59.1 | 77.3 | 80.5 | 82.4 | 86.3 |
| Net NO$_x$ % | 75.1 | 82.5 | 84.7 | 85.8 | 77.6 |
| TWC Window$^a$, % | 54.4 | 61.0 | 63.9 | 65.2 | cannot compute |

$^a$The area under CO and NO$_x$ curves between 0.3 units on either side of the R value at the crossover point.

The data shows an optimum Net NO$_x$ conversion under lean conditions (R = 1.5) for the D sample with shouldering values for the C and E samples. A similar optimum for peak Net NO$_x$ is also shown for Sample D. From this impregnation strategy optimum results are shown for spheroids having a GSA/BV ratio of from about 17 to 25.

It is understood that the foregoing detailed description is given merely by way of illustration and that many variations may be made therein without departing from the spirit of this invention.

What is claimed is:

1. A catalyst suitable for auto emission control comprising alumina particles having a geometric surface area to bulk volume ratio of from about 17 to 25 cm$^2$/cm$^3$, a low compacted bulk density of about 20 to about 36 pounds per cubic foot and a catalytically-effective amount of one or more platinum group metals deposited on the alumina particle.

2. A catalyst according to claim 1, wherein the alumina particles are spheroidal, have an equivalent diameter of less than 2.6 mm when measured on a sphere having an equivalent volume as the spheroidal particle, and have a crushing force per radius squared of at least 8.0 Newtons/mm$^2$.

3. A catalyst according to claim 1, wherein the platinum group metal is selected from the group consisting of platinum, rhodium, palladium and mixtures thereof.

4. A catalyst according to claim 1, further comprising a promoter selected from the group consisting of ceria, alkali metal oxides, and mixtures thereof.

* * * * *